United States Patent
Ng et al.

(10) Patent No.: US 11,594,807 B2
(45) Date of Patent: Feb. 28, 2023

(54) METHODS OF RF COMPLIANCE FOR TERMINAL

(71) Applicant: Samsung Electronics Co., Ltd., Suwon-si (KR)

(72) Inventors: Boon Loong Ng, Plano, TX (US); Suha Yoon, Yongin-si (KR); Sungchul Park, Seoul (KR); Jianhua Mo, Allen, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 16/848,693

(22) Filed: Apr. 14, 2020

(65) Prior Publication Data

US 2020/0411960 A1    Dec. 31, 2020

Related U.S. Application Data

(60) Provisional application No. 62/889,142, filed on Aug. 20, 2019, provisional application No. 62/866,878, filed on Jun. 26, 2019.

(51) Int. Cl.
*H01Q 1/24* (2006.01)
*H01Q 21/00* (2006.01)
(Continued)

(52) U.S. Cl.
CPC ............ *H01Q 1/245* (2013.01); *G01S 7/006* (2013.01); *G01S 13/10* (2013.01); *H01Q 21/0025* (2013.01); *H04B 1/3838* (2013.01)

(58) Field of Classification Search
CPC ........ G01S 13/10; G01S 13/44; G01S 13/582; G01S 13/86; G01S 2013/0245;
(Continued)

(56) References Cited

U.S. PATENT DOCUMENTS 8,811,918 B2 * 8/2014 Rath .................... H04B 7/0689
455/127.2
9,893,538 B1   2/2018 Bell et al.
(Continued)

FOREIGN PATENT DOCUMENTS

KR    10-2017-0036750 A    4/2017
WO        2018191036 A1   10/2018

OTHER PUBLICATIONS

International Search Report of the International Searching Authority in connection with International Application No. PCT/KR2020/007601 dated Sep. 11, 2020, 3 pages.
(Continued)

*Primary Examiner* — Nguyen T Vo

(57) ABSTRACT

A method and electronic device for applying a maximum permissible exposure (MPE) operation on the electronic device. The electronic device includes a plurality of antenna arrays and a processor operably connected to the plurality of antenna arrays. The processor is configured to detect a MPE condition for radio frequency exposure and apply a MPE operation, from among a plurality of MPE operations, to at least one of the plurality of antenna arrays to modify the radio frequency exposure. The MPE operation includes coordination of at least two antenna arrays for signal transmission.

16 Claims, 11 Drawing Sheets

(51) Int. Cl.
*G01S 13/10* (2006.01)
*G01S 7/00* (2006.01)
*H04B 1/3827* (2015.01)

(58) Field of Classification Search
CPC ......... G01S 7/006; G01S 7/417; H01Q 1/243; H01Q 1/245; H01Q 21/0025; H04B 1/3838; H04W 52/367
See application file for complete search history.

(56) References Cited

U.S. PATENT DOCUMENTS

| | | | |
|---|---|---|---|
| 10,812,125 | B1 | 10/2020 | Badic et al. |
| 2016/0095072 | A1 | 3/2016 | Lee et al. |
| 2016/0164563 | A1 | 6/2016 | Khawand et al. |
| 2016/0327634 | A1* | 11/2016 | Katz .................. H01Q 1/245 |
| 2017/0179771 | A1 | 6/2017 | Leabman |
| 2017/0332333 | A1 | 11/2017 | Santhanam et al. |
| 2018/0278318 | A1 | 9/2018 | Chakraborty et al. |
| 2019/0020097 | A1 | 1/2019 | Chang et al. |
| 2020/0203853 | A1* | 6/2020 | Hu .................... H01Q 1/246 |
| 2020/0205087 | A1* | 6/2020 | Hong ................. H04W 52/283 |
| 2020/0404598 | A1* | 12/2020 | Landis ............... H04W 24/08 |

OTHER PUBLICATIONS

Motorola, "Motorola Model: MD1005G; FCC ID: IHDT56XL1; Power Density Simulation and Measurement Report", Rev. 1.2, AR-18-0001, Dec. 2018, 15 pages.
Qualcomm, "Qualcomm Introduces the World's Most Advanced 5G Mobile Platform", Qualcomm Technologies, Inc., Dec. 4, 2019, 8 pages.
Extended European Search Report dated May 19, 2022 regarding Application No. 20832097.8, 10 pages.
Qualcomm Incorporated, "Enhancements on Multi-beam Operation", 3GPP TSG-RAN WG1 Meeting #96-Bis, R1-1905027, XP051691944, Apr. 2019, 26 pages.

* cited by examiner

METHODS OF RF COMPLIANCE FOR TERMINAL

CROSS-REFERENCE TO RELATED APPLICATION(S) AND CLAIM OF PRIORITY

This application claims priority under 35 U.S.C. § 119(e) to U.S. Provisional Patent Application No. 62/866,878 filed on Jun. 26, 2019 and U.S. Provisional Patent Application No. 62/889,142 filed on Aug. 20, 2019. The above-identified provisional patent applications are hereby incorporated by reference in their entirety.

TECHNICAL FIELD

This disclosure relates generally to electronic devices. More specifically, this disclosure relates to millimeter wave (mmWave) wireless communication systems and operations for controlling radio frequency (RF) exposure.

BACKGROUND

The use of mobile computing technology such as a portable electronic device, including radio devices, has greatly expanded largely due to usability, convenience, computing power, and the like. As a result of the common usage of such devices, the Federal Communications Commission (FCC) has implemented guidelines and regulations to limit the amount of RF exposure to a human. The FCC defines RF compliance requirements for radio devices to ensure safety of operations, which aims to prevent a human exposure hazard represented by a tissue temperature change. The RF compliance requirement for frequency above 6 GHz is called the Maximum Permissible Exposure (MPE), which is defined by a Power Density (PD) limit. In the FCC issued Interim Guidance on Oct. 3, 2018, the limit for 28 GHz and 39 GHz is defined as 10 W/m$^2$ in 4 cm$^2$ area with averaging time of 4 seconds. Operations for the radio device to comply with the RF safety requirements includes performing actions such as turning off transmission of an antenna module when the risk of RF exposure to human skin may exceed the specified limit. However, the limited options of turning off or reducing transmission of antenna modules slows down the uplink transmission of radio devices.

SUMMARY

This disclosure provides methods and apparatuses for controlling RF exposure in mmWave wireless communication systems.

In a first embodiment, an electronic device includes a plurality of antenna arrays and a processor operably connected to the plurality of antenna arrays. The processor is configured to detect a maximum permissible exposure (MPE) condition for radio frequency exposure. The processor is further configured to apply a MPE operation, from among a plurality of MPE operations, to at least one of the plurality of antenna arrays to modify the radio frequency exposure. The MPE operation includes coordination of at least two antenna arrays for signal transmission.

In a second embodiment, a method to apply a MPE operation on an electronic device includes detecting a MPE condition for radio frequency exposure. The method further includes applying the MPE operation, from among a plurality of MPE operations, to at least one of a plurality of antenna arrays to modify the radio frequency exposure. The MPE operation includes coordination of at least two antenna arrays for signal transmission.

Other technical features may be readily apparent to one skilled in the art from the following FIGS., descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 15, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
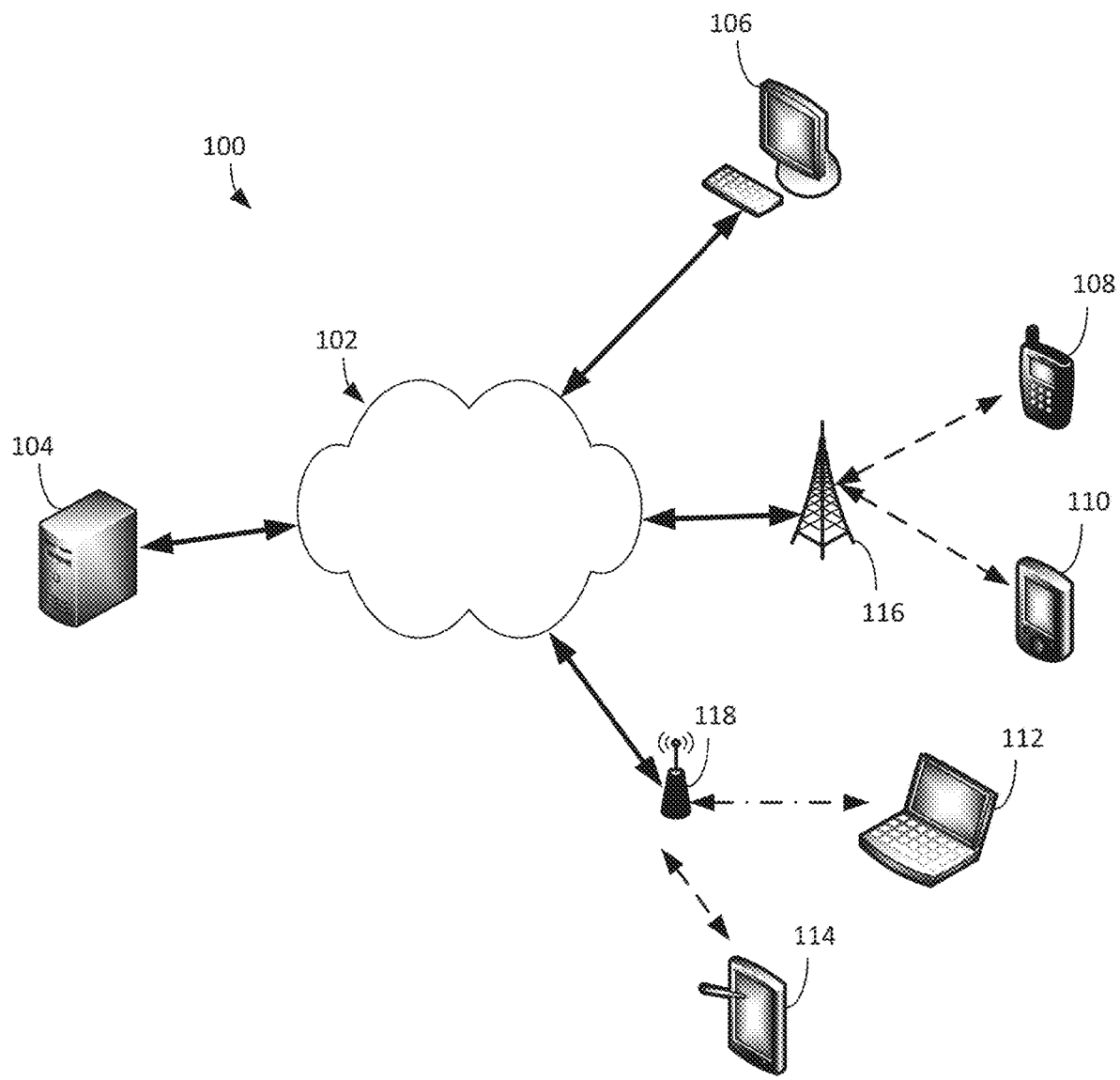
FIG. 1 illustrates an example communication system according to embodiments of this disclosure.

FIG. 1 illustrates an example communication system 100 according to embodiments of this disclosure. The embodiment of the computing system 100 shown in FIG. 1 is for illustration only. Other embodiments of the computing system 100 could be used without departing from the scope of this disclosure.

As shown in FIG. 1, the communication system 100 includes a network 102, which facilitates communication between various components in the communication system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals for face authentication, anti-spoofing and gesture recognition.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
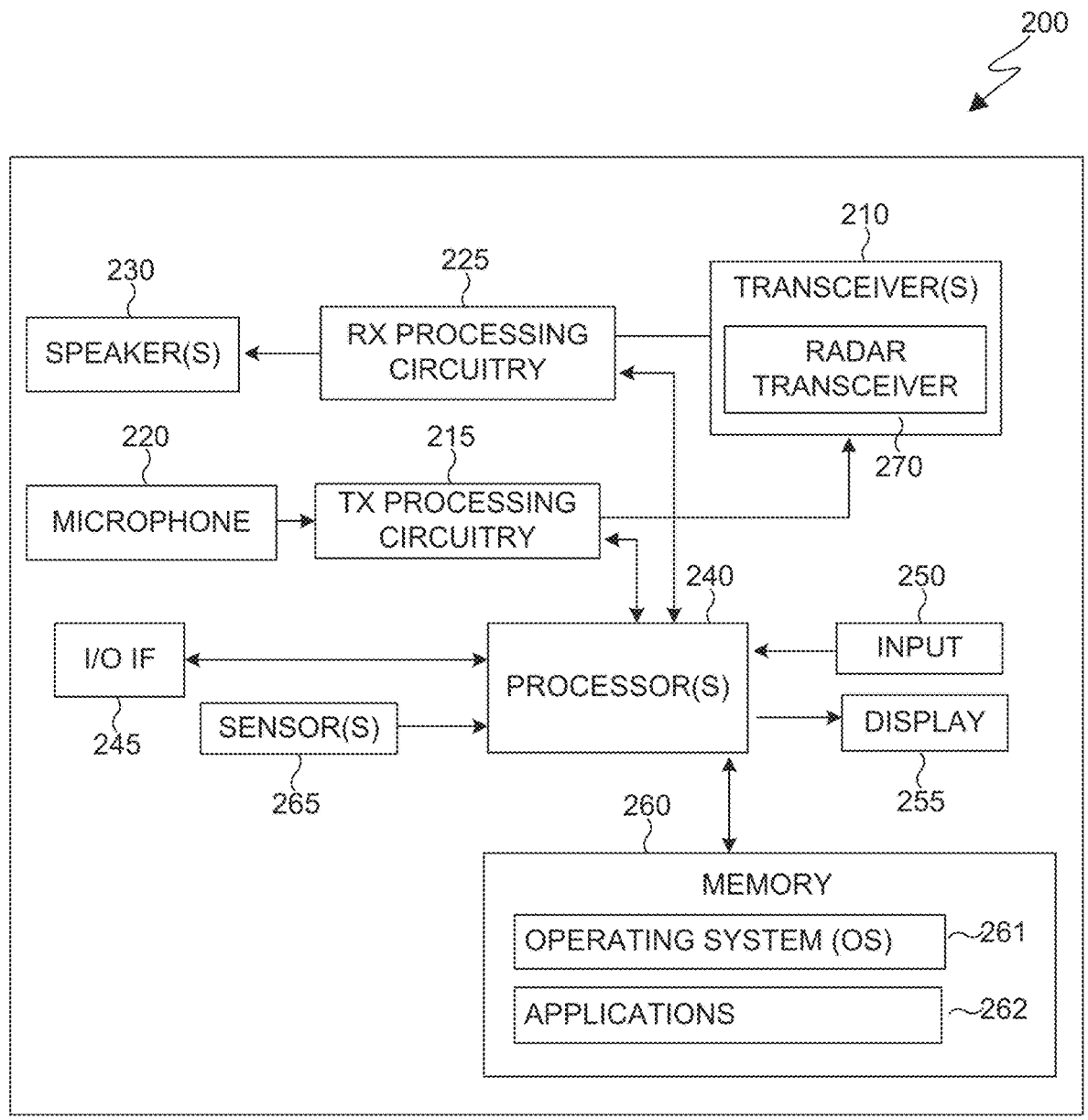
FIG. 2 illustrates an example electronic device according to embodiments of this disclosure.

FIG. 2 illustrates an example electronic device 200 according to embodiments of this disclosure. The electronic device 200 can be a mobile communication device, such as, for example, a mobile station, a subscriber station, a wireless terminal, a desktop computer a portable electronic device and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WI-FI transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, a sensor(s) 265, and a camera 275. The memory 260 includes an operating system (OS) 261, and one or more applications 262.

The transceiver(s) 210 can include an antenna array including numerous antennas. The transceiver(s) 210 can transmit and receive a signal or power to or from the electronic device 200. The transceiver 210 transmits signals to other components in a system and receives incoming signals transmitted by other components in the system. For example, the transceiver 110 transmits and receives RF signals, such as BLUETOOTH or WI-FI signals, to and from an access point (such as a base station, WI-FI router, BLUETOOTH device) of a network (such as a WI-FI, BLUETOOTH, cellular, 5G, LTE, LTE-A, WiMAX, or any other type of wireless network). The received signal is processed by the RX processing circuitry 225. The RX processing circuitry 225 may transmit the processed signal to the speaker 230 (such as for voice data) or to the processor 240 for further processing (such as for web browsing data). The TX processing circuitry 215 receives voice data from the microphone 220 or other outgoing data from the processor 240. The outgoing data can include web data, e-mail, or interactive video game data. The TX processing circuitry 215 processes the outgoing data to generate a processed signal. The transceiver 210 receives the outgoing processed signal from the TX processing circuitry 215 and converts the received signal to an RF signal that is transmitted via an antenna. In other embodiments, the transceiver 210 can transmit and receive radar signals to detect the potential presence of an object in the surrounding environment of the electronic device 200.

In this embodiment, one of the one or more transceivers in the transceiver 210 includes is a radar transceiver 270 configured to transmit and receive signals for detection and ranging purposes. For example, the radar transceiver 270 may be any type of transceiver including, but not limited to a WiFi transceiver, for example, an 802.11ay transceiver. The radar transceiver 270 includes an antenna array that includes transmitter and receiver antenna arrays. The antenna array may include an antenna including a radiating element composed of a conductive material or a conductive pattern formed in or on a substrate (e.g., PCB). An additional component (e.g. a radio frequency integrated circuit (RFIC)) other than the radiating element may be additionally formed as part of the antenna array. The radar transceiver 270 can transmit signals at a frequency less than or equal to 100 GHz. For example, the transmitter 257 can transmit signals at frequencies including, but not limited to, 6-8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. The processor 240 can analyze the time difference between when the signals are transmitted by the radar transceiver 270 and received by the radar transceiver 270 to measure the distance of the target objects from the electronic device 200.

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the RF transceiver 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 140 is configured to execute the one or more applications 262 based on the OS 261 or in response to signals received from external source(s) or an operator. Example, applications 262 can include an authentication program as well as a program or file that requires authentication prior to accessing.

The processor 240 is also coupled to the I/O interface 245 that provides the electronic device 200 with the ability to connect to other devices. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265 and/or a camera by providing additional input to the processor 240. In certain embodiments, the sensor 265 includes one or more inertial measurement units (IMUs) (such as accelerometers, gyroscope, and magnetometer), motion sensors, optical sensors, cameras, pressure sensors, heart rate sensors, altimeter, and the like. The input 250 can also include a control circuit. In the capacitive scheme, the input 250 can recognize touch or proximity. In certain embodiments, the input 250 includes the antenna 205 which can emit and recite radar signals for authenticating a user.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be sized to fit within a HMD. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc. The memory 260 also can sensitive and confidential information, which require user authentication prior to accessing.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200, within a secondary device operably connected to the electronic device 200, within a headset configured to hold the electronic device 200, or in a singular device where the electronic device 200 includes a headset.

In certain embodiments, the radar transceiver 270 can include a transmitter and a receiver. The transmitter can transmit millimeter wave (mmWave) signals. The receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices, including, for example, without limitation a robot.

Figure 3:
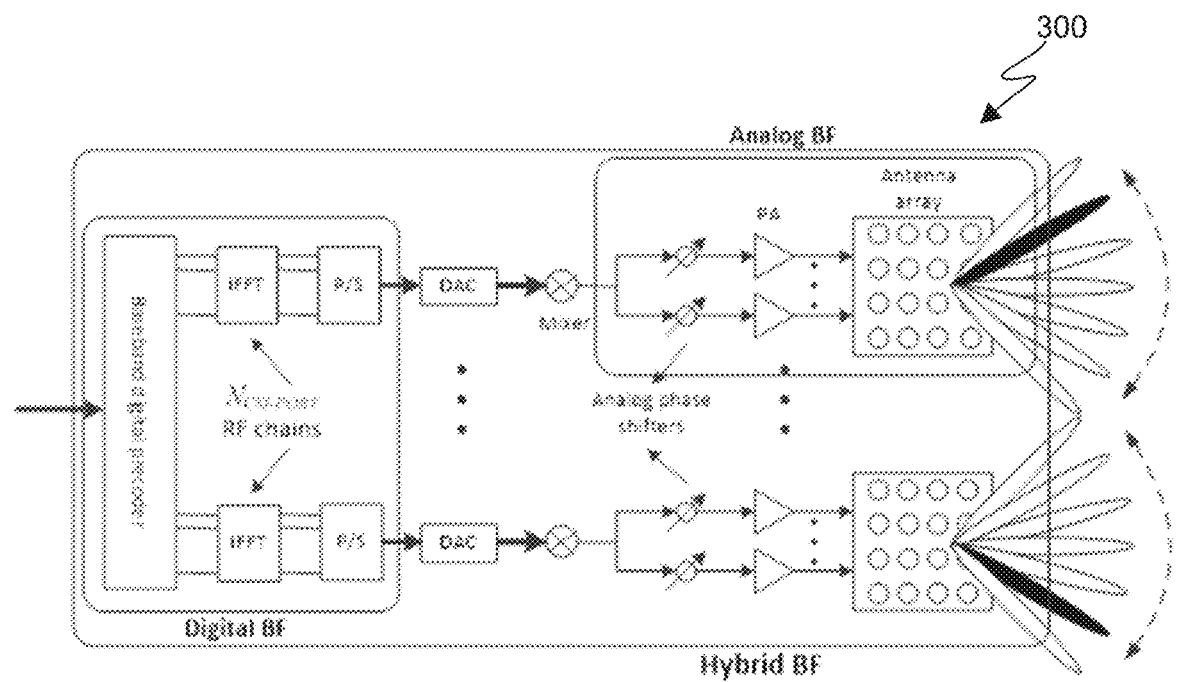
FIG. 3 illustrates an example architecture to achieve hybrid beamforming according to embodiments of this disclosure.

FIG. 3 illustrates an example antenna architecture 300 to achieve hybrid beamforming according to embodiments of this disclosure. The embodiment of FIG. 3 is for illustration only. Other embodiments can be used without departing from the scope of the present disclosure.

For mmWave bands, the number of antenna elements can be large for a given form factor. However, the number of digital chains is limited due to hardware constraints (such as the feasibility to install a large number of ADCs/DACs at mmWave frequencies) as illustrated in FIG. 3. For example, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. The hybrid beamforming architecture as illustrated in FIG. 3 can be applied at a base station and at a user equipment (UE) such as the electronic device 200.

Figure 4:
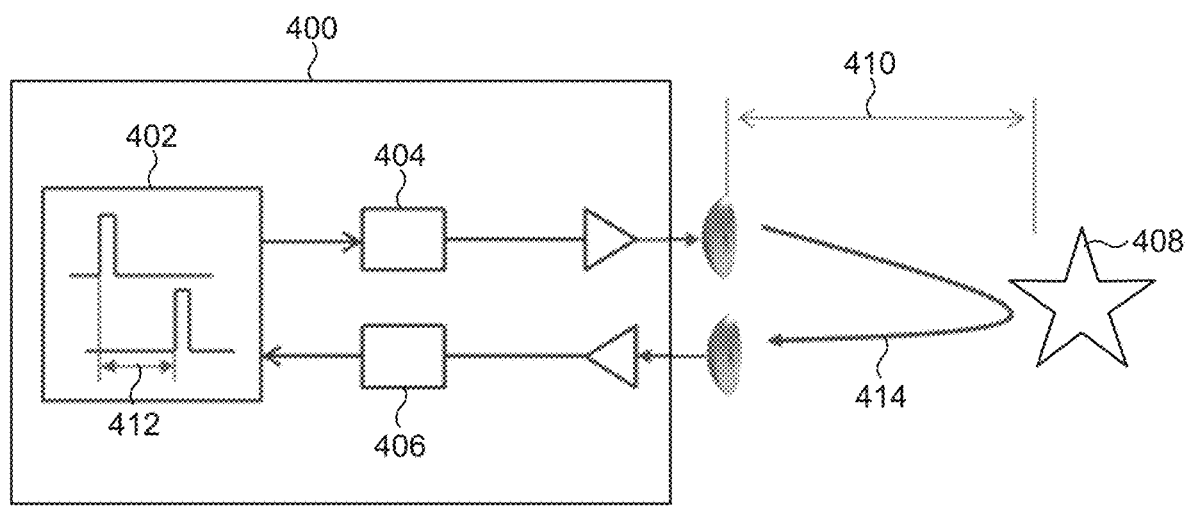
FIG. 4 illustrates an example architecture of a monostatic radar according to embodiments of this disclosure.

FIG. 4 illustrates an example architecture of a monostatic radar according to embodiments of this disclosure. The embodiment of FIG. 4 is for illustration only. Other embodiments can be used without departing from the scope of the present disclosure.

FIG. 4 illustrates an electronic device 400 that includes a processor 402, a transmitter 404 and a receiver 406. The electronic device 400 can be similar to any of the electronic device 200 of FIG. 2. The processor 402 is similar to the processor 240 of FIG. 2. Additionally, the transmitter 404 and the receiver 406 can be similar to the radar transceiver 270 of FIG. 2.

The transmitter 404 transmits a radar signal 414 to a target 408 a distance 410 away. In certain embodiments, the target 408 is a hand or other body part of a user when the electronic device 400 is being used.

Monostatic radar is characterized for its delayed echo as the transmitter 404 of the radar signal and the receiver 406 of the radar signal are essentially at the same location. In certain embodiments the transmitter 404 and the receiver 406 are co-located either by using a common antenna or nearly co-located but use separate but adjacent antennas. Monostatic radars are assumed coherent such that the transmitter 404 and the receiver 406 are synchronized via a common time reference.

A pulse radar is generated as a realization of a desired radar waveform, modulated onto a radio carrier frequency and transmitted through a power amplifier and antenna. For example, FIG. 4 illustrates a parabolic antenna. In certain embodiments, the antenna is omnidirectional. In other embodiments, the antenna is focused into a particular direction. When the target 408 is within the field of view of the transmitted signal and within a distance 410 from the radar location, then the target 408 will be illuminated by RF power density, $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \qquad \text{Equation (1)}$$

Referring to Equation 1, PT is the transmit power (Watts). $G_T$ and $A_T$ describe the transmit antenna gain (dBi) for an effective aperture area ($m^2$). $\lambda$ corresponds to the wavelength of the radar signal RF carrier signal (m), and R corresponds to the distance (m) 410 between the antenna and the target 408. In certain embodiments, effects of atmospheric attenuation, multi-path propagation, antenna loss and the like are negligible.

The transmit power density impinging onto the target 408 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{ref1} = p_t A_t G_t \sim p_t A_t r_t \frac{A_t}{\lambda^2/4\pi} = p_t RSC \quad \text{Equation (2)}$$

In Equation 2, $P_{ref1}$ describes the effective isotropic target-reflected power. The term, $A_t$ described the effective target area normal to the radar direction, the term $r_t$ describes the reflectivity of the material and shape, while the term $G_t$ describes the corresponding aperture gain. RSC is the radar cross section which is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 410 to the target 408 is known.

The target reflected power at the receiver location results from the reflected power density at the reverse distance 410 collected over the receiver antenna aperture area. Equation (3), below, describes the received target reflected power. It is noted that $P_R$ is the received target reflected power and $A_R$ is the receiver antenna effective aperture area. In certain embodiments, $A_R$ is the same as $A_T$.

$$P_R = \frac{P_{ref1}}{4\pi R^2} A_R = P_T \cdot RSC \frac{A_T A_R}{4\pi \lambda^2 R^4} \quad \text{Equation (3)}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constraint multiplied by the current temperature. B is the radar signal bandwidth in Hz. F is the receiver noise factor which is a degradation of the receiver signal SNR due to noise contributions of the receiver circuit itself $$SNR = \frac{P_R}{kT \cdot B \cdot F} \quad \text{Equation (4)}$$

When the radar signal is a short pulse of duration, $T_p$, the delay 412 between the transmission and reception of the corresponding echo is described in Equation (5). $\tau$ corresponds to the delay 412 and c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_p$ exhibits a power spectral density as described in Equation (7) and includes a first null at its bandwidth as shown in Equation (8). The range resolution of a radar signal fundamental connected with the bandwidth of the radar waveform is expressed in Equation (9).

$$\tau = 2R/c \quad \text{Equation (5):}$$

$$\Delta R = c\Delta\tau/2 = cT_p/2 \quad \text{Equation (6):}$$

$$P(f) \sim (\sin(\pi f T_p)/(\pi f T_p))^2 \quad \text{Equation (7):}$$

$$B = 1/T_p \quad \text{Equation (8):}$$

$$\Delta R = c/2B \quad \text{Equation (9):}$$

Channel impulse response (CIR) is a measure of the reflected signals, or echos, from potential targets as a function of the distance at the receiving antenna module.

Radio devices that emit RF are subject to guidelines and regulations to ensure safe operation. For example, RF compliance guidelines aim to prevent a tissue temperature change that would result in a hazard to human skin. The RF compliance requirement, as defined by the Federal Communications Commission (FCC), for frequencies above 6 GHz is called the Maximum Permissible Exposure (MPE). The MPE is defined by a Power Density (PD) limit. The PD limit for 28 GHz and 39 GHz is defined as 10 W/m² in 4 cm² area with an averaging time of 4 seconds. One way for a radio device to comply with the RF safety requirements is by performing actions such as turning off transmission of an antenna module when the risk of RF exposure to human skin may exceed the specified limit. Other examples of MPE compliance operations include but are not limited to following:

a) Transmit power back-off: The transmit power of antenna elements is reduced. This directly reduces the effective isotropic radiated power (EIRP) and the power density. There can be one or more power back-off levels to produce the EIRP and power density level depending on the distance of the object. The power level should be decreased with decreasing distance of the object. Zero transmit power can be seen as a special case of transmit power back-off.

b) Reduced transmission or uplink duty cycle: The ratio transmission duration to the total duration is reduced. This reduces the power density since the power density in W/m² is measured with the averaging time of 4 seconds according to the FCC guidance. The transmission duty cycle should be decreased with decreasing distanced of the object.

c) Switching to a different beam:
  i. Using the same antenna module: This includes switching to a different beam of the same antenna array or a different antenna array in the same antenna module. An antenna array can generate one or more beams. Different beam may produce its peak gain at different direction, and more generally the radiation pattern of different beam may be different. Hence, the impact to power density produced by different beams may also be different. The set of beams that can be generated by the antenna module is called a beam codebook. In one embodiment, one or more beams in the beam codebook can be disabled in order to meet MPE compliance. The beams that are disabled are the beams that can generate power density exceeding the allowed limit. In another embodiment, one or more beams in the beam codebook can be replaced by a different set of beams. The replacement beams can be utilized such that the resulting power density does not exceed the allowed limit.

ii. Using a different antenna module: The current antenna module can be turned off or disabled, and another antenna module is used instead for transmission. The transmission of the other antenna module reduces the power density experienced by the detected/target object.

According to embodiments of this disclosure the MPE operation can be adaptive. That is, the MPE operation can take place only when a condition requiring an MPE operation is present. The MPE operations (a) and (b) above may not need to be applied to all antenna elements or antenna arrays in the antenna module, or the power amplifiers driving the antenna elements or antenna arrays. According to embodiments, some of the antenna elements can perform MPE operation (a) and/or (b). For example, the antenna elements can be turned off, to reduce the power density. In another embodiment, one antenna module may have more than one antenna arrays, for example, an antenna array of patch antennas, and an antenna array of dipoles. If the antenna module's first antenna array's transmission is exceeding the MPE compliance due to the proximity of an object, while the module's second antenna array's transmission does not have the same issue, the first antenna array can perform MPE operation (a) and/or (b). For example, the first antenna array can be turned off, to reduce the power density.

Figure 5:
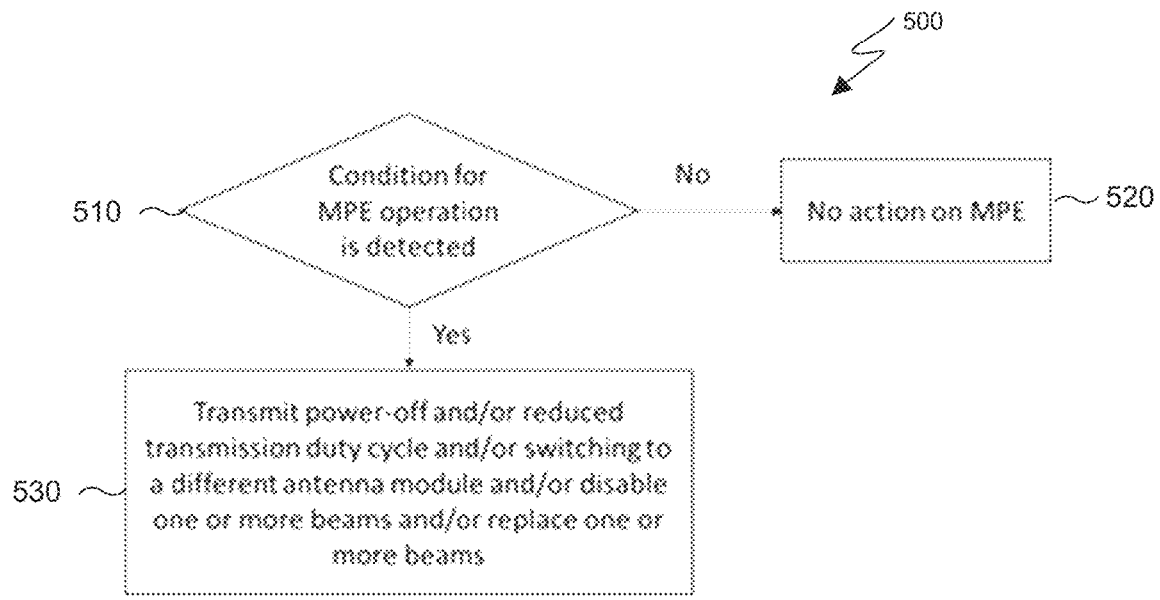
FIG. 5 illustrates a block diagram of an example method for applying an adaptive MPE operation according to embodiments of this disclosure.

FIG. 5 illustrates a block diagram of an example method 500 for applying an adaptive MPE operation according to embodiments of this disclosure. The embodiment of FIG. 5 is for illustration only. Other embodiments can be used without departing from the scope of the present disclosure.

In step 510, a UE, such as electronic device 200 of FIG. 2, determines whether a condition for an MPE operation is detected. If no condition is detected, the UE continues to operate in the current fashion and no MPE operation is performed in step 520. When a condition of an MPE operation is detected, the UE applies an MPE operation according to the MPE condition that is detected in step 530. According to embodiments of this disclosure the MPE operation includes at least one of transmitting power-off, reducing transmission duty cycle, switching to a different antenna module, disabling one or more beams, or replacing one or more beams.

A UE can be configured with multiple serving cells by a network node such as gNB or eNB. At least one or more serving cells can be activated by a command transmitted from the network node and used for the data communication service. Among multiple antenna modules equipped in the UE, at least one antenna module can be selected and used for those activated serving cells. In one embodiment, when the condition for MPE operation is detected, the MPE compliance operation can be applied to at least one of the activated serving cells. Among multiple activated serving cells, secondary cells can be selected with higher priority for the MPE compliance operation. The UE can estimate the result of applying the MPE compliance operation to the selected secondary cells, and if the result still trigger the MPE compliance operation, then the UE can include the primary cell for the MPE compliance operation as well.

Figure 6:
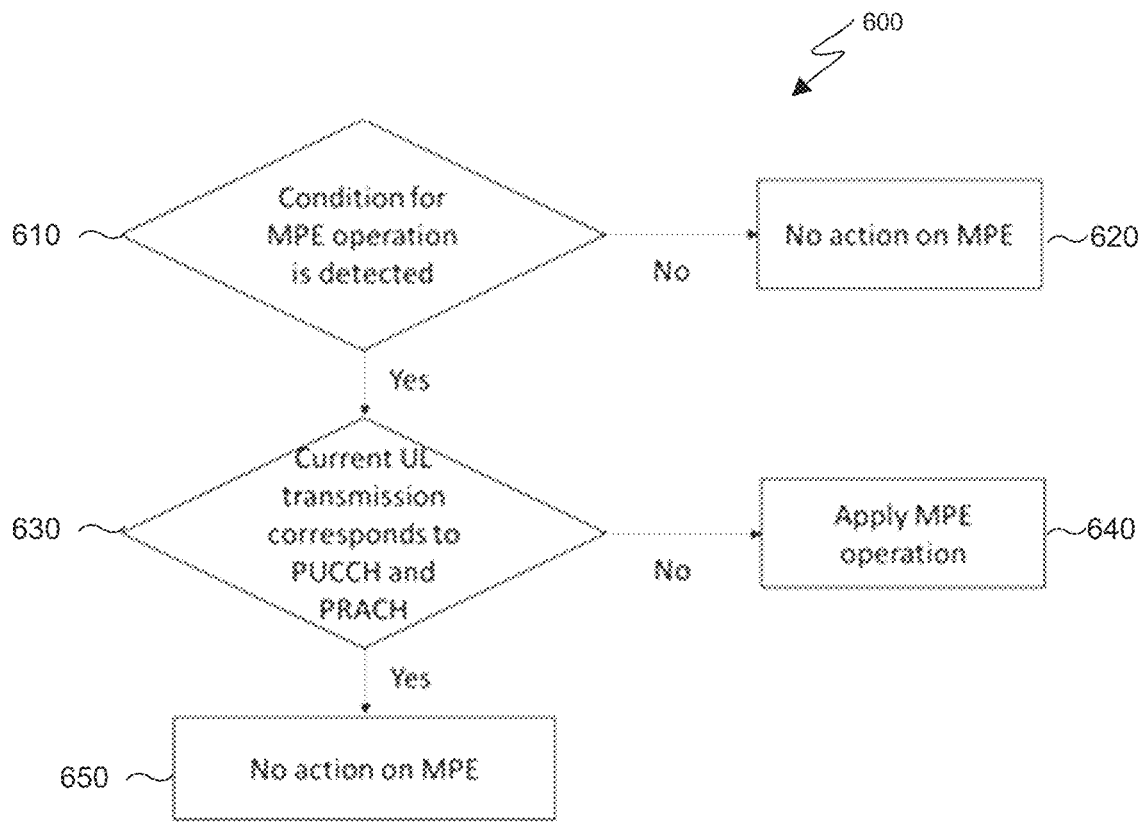
FIG. 6 illustrates a block diagram of an example method for applying an adaptive MPE operation depending on UL channel or signal type according to embodiments of this disclosure.

FIG. 6 illustrates a block diagram of an example method 600 for applying an adaptive MPE operation depending on UL channel or signal type according to embodiments of this disclosure. The embodiment of FIG. 6 is for illustration only. Other embodiments can be used without departing from the scope of the present disclosure.

Referring to the non-limiting example of FIG. 6, an MPE operation can be applied, or can be prioritized to be applied to a certain uplink signals or channels by the UE. In step 610, the UE, such as electronic device 200 of FIG. 2, determines whether or not a condition for an MPE operation is detected. If it is not, the UE continues to perform normal operations in step 620. If it is determined that an MPE condition is detected, the MPE operation is applied only to uplink channels that carry best effort data, such as the PUSCH. This is possible because different physical channels are transmitted orthogonally in time for a UE. For example, in step 630 the UE determines whether the current uplink (UL) transmission corresponds to physical uplink control channel (PUCCH) or physical random access channel (PRACH). If the UL transmission corresponds to PUCCH or PRACH then no MPE operation is applied by the UE in step 650. If the UL transmission does not correspond to PUCCH or PRACH and corresponds to uplink channels that carry best effort data, for example PUSCH or SRS, then a MPE operation is applied by the UE in step 640. According to embodiments of this disclosure a MPE operation can be applied on PUSCH without UCI, while not applying an MPE operation for PUCCH, PRACH, and PUSCH with UCI. This can be prioritized since UCI is considered important data. More than one UL channels transmission profile can be defined, where each profile corresponds to a pattern of different UL physical channel transmission over a time period. Depending on the detection of the condition of MPE operation, a UL channels transmission profile that can meet the MPE requirement is selected. According to other embodiments of this disclosure, if a more aggressive MPE operation is determined to be needed, more physical channels or signals can be subjected to an MPE operation, with a certain order of priority. For example, an MPE operation would be applied in cases of UL transmission of PUSCH with UCI before being applied in cases of UL transmission of PUCCH. As another example, an MPE operation would be applied in cases of UL transmission of PUCCH before being applied in cases of UL transmission of PRACH. Although FIG. 6 includes a condition detection for MPE operation, this needs not be included if desired (e.g. for simplicity), i.e. the application of MPE operation depending on uplink signals/channels can always be applied as long there is uplink transmission.

According to embodiments of this disclosure, if a MPE operation is applied to more than one physical channel type, the MPE operation can also be different. For example, a larger power back-off can be applied to a physical channel with a high priority of MPE operation. According to embodiments of this disclosure, a different MPE operation for a different channel can apply a smaller duty cycle (less uplink transmission) for the MPE prioritized UL physical channel (e.g. PUSCH) compared to the other UL physical channels (e.g. PUCCH and PRACH). One illustrative example is as shown in FIG. 7A.

Figure 7A:
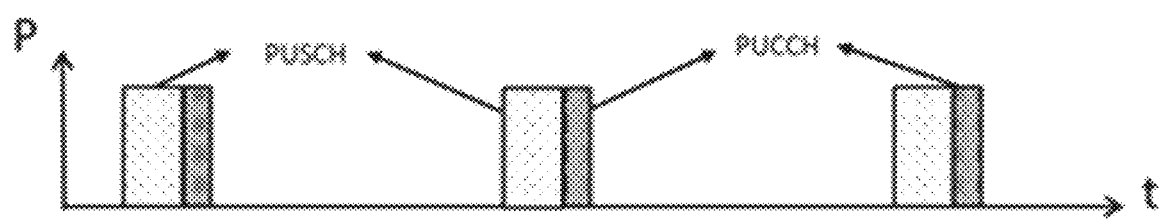
FIG. 7A illustrates reduced UL duty cycling for MPE compliance being applied equally to all physical channel types an electronic device according to embodiments of this disclosure.
Figure 7B:
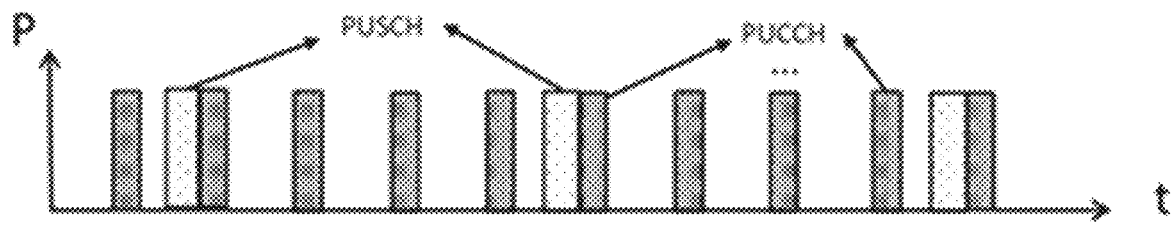
FIG. 7B illustrates reduced UL duty cycling for MPE compliance being applied to PUSCH, but not PUCCH according to embodiments of this disclosure.

FIG. 7A illustrates reduced UL duty cycling for MPE compliance being applied equally to all physical channel types an electronic device according to embodiments of this disclosure. FIG. 7B illustrates reduced UL duty cycling for MPE compliance being applied to PUSCH, but not PUCCH according to embodiments of this disclosure. The embodiments of FIGS. 7A and 7B are for illustration only. Other embodiments can be used without departing from the scope of the present disclosure.

Referring to FIG. 7A, a UL duty cycle of 25% can be achieved with 1 UL slot for every 4 slots, and each slot contains 12 PUSCH symbols and 2 PUCCH symbols (slot boundary not shown in the figure). FIG. 7B illustrates the case where reduced UL duty cycling for MPE compliance is applied to PUSCH, but not the PUCCH. For example, six PUSCH symbols per UL slot with the periodicity of one UL PUSCH slot for every four slots can be configured. For PUCCH, two symbols in every slot can still be configured with no reduction in duty cycle. This example of reducing the duty cycle for PUSCH but not for PUCCH maintains the 25% duty cycle overall to comply with MPE, while allowing more frequent transmission opportunities for PUCCH to carry uplink control information.

According to embodiments of this disclosure, the method of applying different MPE operations for different channels can also be applied in the case where an MPE condition is not detected according to a priority rule. That is, referring to FIG. 6, steps 610 and 620 are eliminated and the method to apply an MPE operation is dependent only on what type of uplink carriers are configured or activated for a UE in step 630. The priority rule to apply a MPE operation can depend on the frequency band or the functionality of the uplink carrier. An example operation of the priority rule is as follows. When a first condition for MPE operation is triggered, the uplink carrier that is prioritized for MPE operation is subject to the MPE operation such as transmit power back-off or duty cycle reduction, while the uplink carrier that is not prioritized for MPE operation does not require the MPE operation. When a second condition for MPE operation is triggered, which requires more aggressive response from the terminal, both the prioritized and non-prioritized carriers can be applied with the MPE operation. The MPE operation applied to both types of carriers can be the same or different. An example of a different MPE operation for a different carrier is to apply a smaller duty cycle, resulting in less uplink transmission, for the MPE prioritized carrier compared to the other carrier. In one example, the secondary carrier can be prioritized for applying a MPE operation, compared to a primary carrier, this is because the primary carrier typically carries more important uplink messages. In another example, the secondary carrier that carries uplink data only can be prioritized for applying MPE operation, compared to another uplink carrier that carries or is configured to carry uplink control information such as PUCCH and HARQ-ACK. In another example, the PSCell can be prioritized for applying MPE operation compared to the PCell. In another example, the uplink carrier that has the most margin for MPE compliance can be prioritized for MPE operation. The examples given for prioritizing the application of MPE operations are given for illustration only and are not to be construed as limiting the present disclosure.

According to embodiments of this disclosure, a MPE operation can be applied, or can be prioritized according to the uplink traffic type that is contained in the transmission. The transmission that contains uplink traffic type which requires lower quality of service (QoS) can be applied with, or can be prioritized for, a MPE operation over the transmission that contains higher QoS. For 5G NR, the QoS of UL traffic can be differentiated by the QoS flow, which is identified within a Protocol Data Unit (PDU) session by a QoS Flow ID (QFI) carried in an encapsulation header over NG-U (NG user plane interface). In one example, the UL traffic corresponding to non-guaranteed bit rate (GBR) flow can be applied or can be prioritized for MPE operation; whereas GBR or delay critical GBR flows are not applied or can be deprioritized for MPE operation. In another embodiment, the UL traffic can also be differentiated through the RNTI type used to scramble the CRC of the UL physical channel. For example, UL transmission not corresponding to MCS-RNTI and CS-RNTI can be applied or can be prioritized for MPE operation. UL transmission corresponding to MCS-RNTI (target high reliability data transmission) and CS-RNTI are not applied or can be deprioritized for MPE operation.

According to embodiments of this disclosure, a UE, like the electronic device 200 of FIG. 2, includes a radar module which can be a separate module located next to, or nearby, the mmWave antenna module, or can be integrated with the mmWave antenna module by co-sharing the same antenna elements, or subset thereof, can be utilized to detect the presence of one or more objects within the detection range. If no object is detected, no action pertaining to MPE compliance is needed. Otherwise, the distance of the detected object from the radar module is estimated from the radar signals reflected off the object, which can be in the form of CIR. A MPE operation can be performed depending on the estimated distance.

Figure 8:
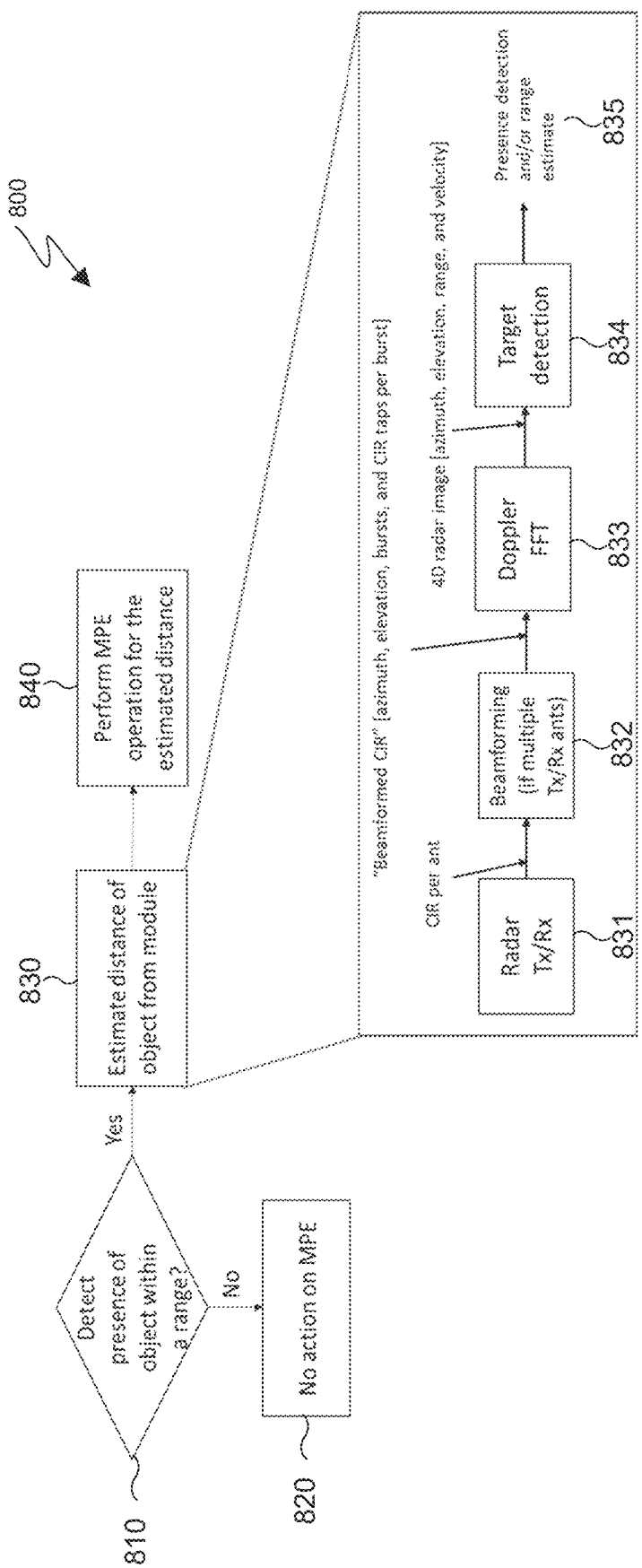
FIG. 8 illustrates a block diagram of an example method for applying an MPE operation dependent on object distance according to embodiments of this disclosure.

FIG. 8 illustrates a block diagram of an example method 800 for applying an MPE operation dependent on object distance according to embodiments of this disclosure. The embodiment of FIG. 8 is for illustration only. Other embodiments can be used without departing from the scope of the present disclosure.

In step 810 a UE, like the electronic device 200, detects whether an object is within a predetermined range. If there is no object within the predetermined range, the electronic device 200 continues to operate under normal conditions in step 820. If there is an object within the predetermined range, the electronic device 200 proceeds to measure the distance of the object from an antenna array using radar signal processing in step 830. Steps 831-835 illustrate an example method for measuring the object distance using radar. In step 831, the radar signal from baseband processing such as the CIR is transmitted and received by the electronic device 200 via the radar transceiver 270. In step 832 the beamforming for all azimuth and elevation directions on the angle grid for each burst in the frame based on the measured or simulated antenna pattern which can be information about quantized phase and amplitude of every antenna element or beam for all azimuth and elevation angles is applied. In step 833, a fast Fourier transform (FFT) is applied on the 4D radar image along the slow time dimension, i.e., along the bursts, resulting in a full 4D radar image (i.e., azimuth, elevation, range and velocity) in space. In step 834, detection of the strongest target is performed. For example, the strongest target is detected by identifying a global maximum in 4D radar image that exceeds a given detection threshold. In step 835, the presence detection of the object or the estimated distance of the object is output. In step 840, the electronic device performs a MPE operation based on the estimated distance of the object from the antenna module.

Although FIG. 8 illustrates one example of a method 800 for applying an MPE operation dependent on object, various changes can be made to FIG. 8. For example, the beamforming, in step 832, may not be performed if angular information is not required. Similarly, step 833, the Doppler FFT, may not be performed if the speed information is not required. Various steps in FIG. 8 could overlap, occur in parallel, occur serially, occur in a different order, or occur any number of times.

Figure 9:
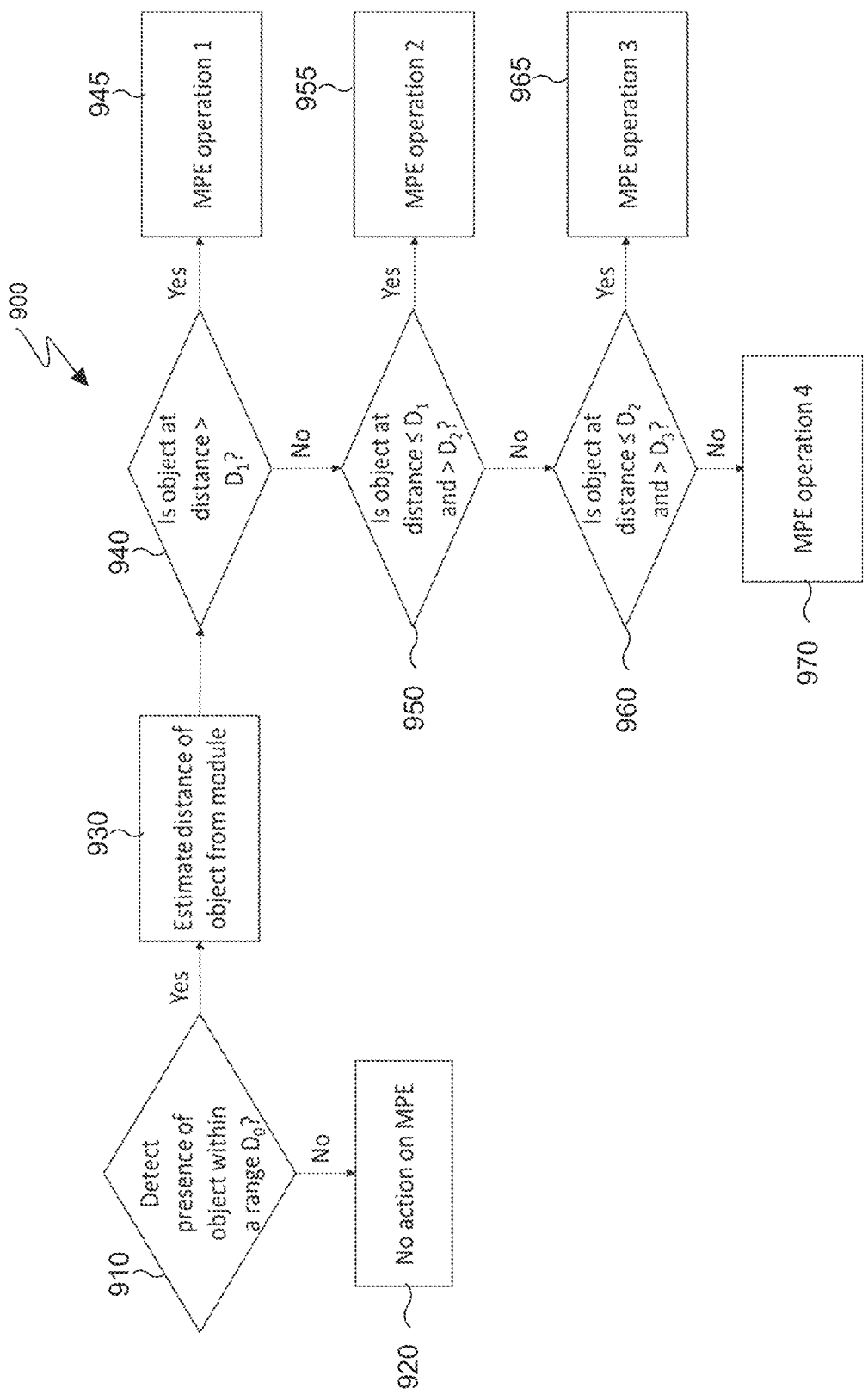
FIG. 9 illustrates a block diagram of example method for applying multiple MPE operations according to an object distance according to embodiments of this disclosure.

FIG. 9 illustrates a block diagram of example method 900 for applying multiple MPE operations according to an object distance according to embodiments of this disclosure. The embodiment of FIG. 9 is for illustration only. Other embodiments can be used without departing from the scope of the present disclosure.

Referring to FIG. 9, a UE's, such as the electronic device 200 of FIG. 2, response to achieve RF compliance is a function of distance of the object in proximity of the antenna array. In step 910, the electronic device 200 detects whether an object is within a predetermined range. The predetermined range is an estimated distance, which can be represented as one value (e.g. in cm) or as a range of values (e.g. 0-4 cm). If there is no object within the predetermined range, the electronic device 200 continues to operate under normal conditions in step 920. If there is an object within the predetermined range, the electronic device 200 proceeds to measure the distance of the object from an antenna array using radar signal processing in step 930. The process to measure the distance using radar signal processing is the same as explained in reference to steps 830, using steps 831-835 of FIG. 8. The distance of the detected object from the radar module is estimated from the radar signals reflected off the object, which can be in the form of CIR. Denote $D_i$, i=0, 1, 2, 3, . . . where $D_i > D_{i+1}$, as the different distances of the detected object from the radar or the antenna module. Different MPE operations can be performed for different distances. According to embodiments of this disclosure, in step 940 the electronic device 200 determines whether object is detected to be at a distance $>D_1$ (but within the presence detection range $D_0$) and if so, MPE operation 1 is performed in step 945. In step 950, the electronic device 200 determines if the object is detected to be at a distance $>D_2$ and $\leq D_1$ and if so, MPE operation 2 is performed in step 955. In step 960, the electronic device 200 determines if the object is detected to be at a distance $>D_3$ and $\leq D_2$ and if so, MPE operation 3 is performed in step 965. Otherwise the electronic device performs MPE operation 4 in step 970.

The MPE operations can be one or more of the MPE compliance operations as described herein. According to embodiments of this disclosure, the different MPE operations can correspond to different power back-offs, such that the transmit power can be reduced in steps when the object is detected to be approaching the module, and vice versa. In another example, the different MPE operations can correspond to different beam switching operations, such that MPE operation 1 can be selecting a different beam in the same antenna array, while MPE operation 2 and 3 can be selecting different beams in a different antenna array of the same antenna module, and MPE operation 4 can be selecting a beam in a different antenna module. This is done to select a beam with relatively larger spatial correlation when the object in proximity is further away. As the object is closer to the antenna module, selection of beam with lower spatial correlation, such as a beam from a different array or a different module can be more suitable because a closer object creates a blockage to the spatial direction radiated by the original beam.

Figure 10:
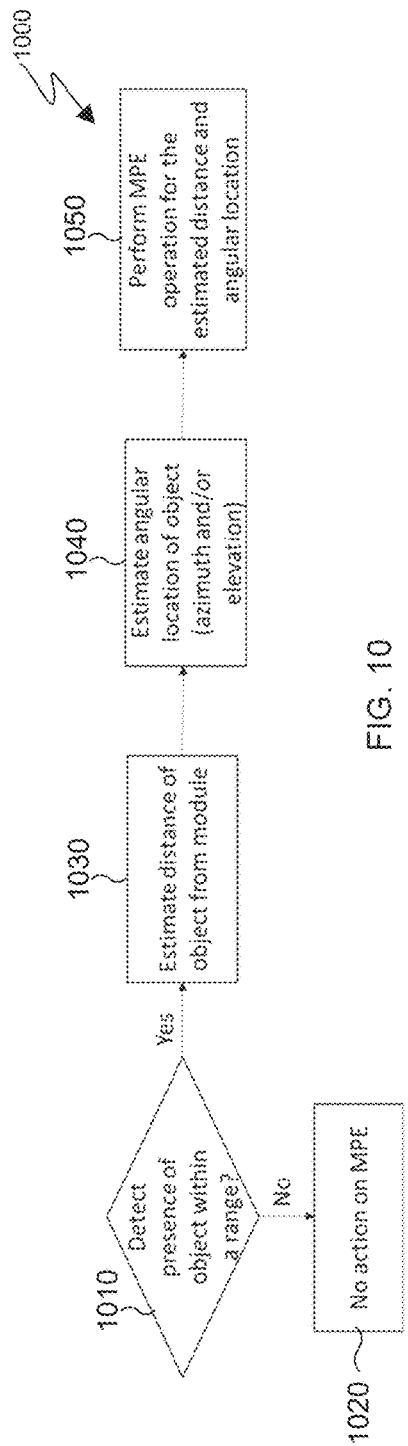
FIG. 10 illustrates a block diagram of an example method for applying an MPE operation based on object distance and angular location according to embodiments of this disclosure.

FIG. 10 illustrates a block diagram of an example method 1000 for applying an MPE operation based on object distance and angular location according to embodiments of this disclosure. A UE, such as the electronic device 200 of FIG. 2, includes a radar module, which can be a separate module located next to, or nearby the mmWave antenna module, or can be integrated with the mmWave antenna module by co-sharing the same antenna elements, or subset thereof, can be utilized to detect the presence of one or more objects within the detection range in step 1010. If no object is detected the electronic device 200 continues to operate in the normal fashion without applying an MPE operation in step 1020. If an object is detected within the range, then in step 1030, the electronic device 200 estimates the distance from the radar module using radar signals reflected off the object, which can be in the form of CIR. In step 1040, the angular location of the object is estimated based on the detected distance. The process to measure the distance using radar signal processing is the same as explained in reference to steps 830, using steps 831-835 of FIG. 8. In step 1050, a MPE operation can be applied according to the estimated distance and the angular location of the object.

Figure 11:
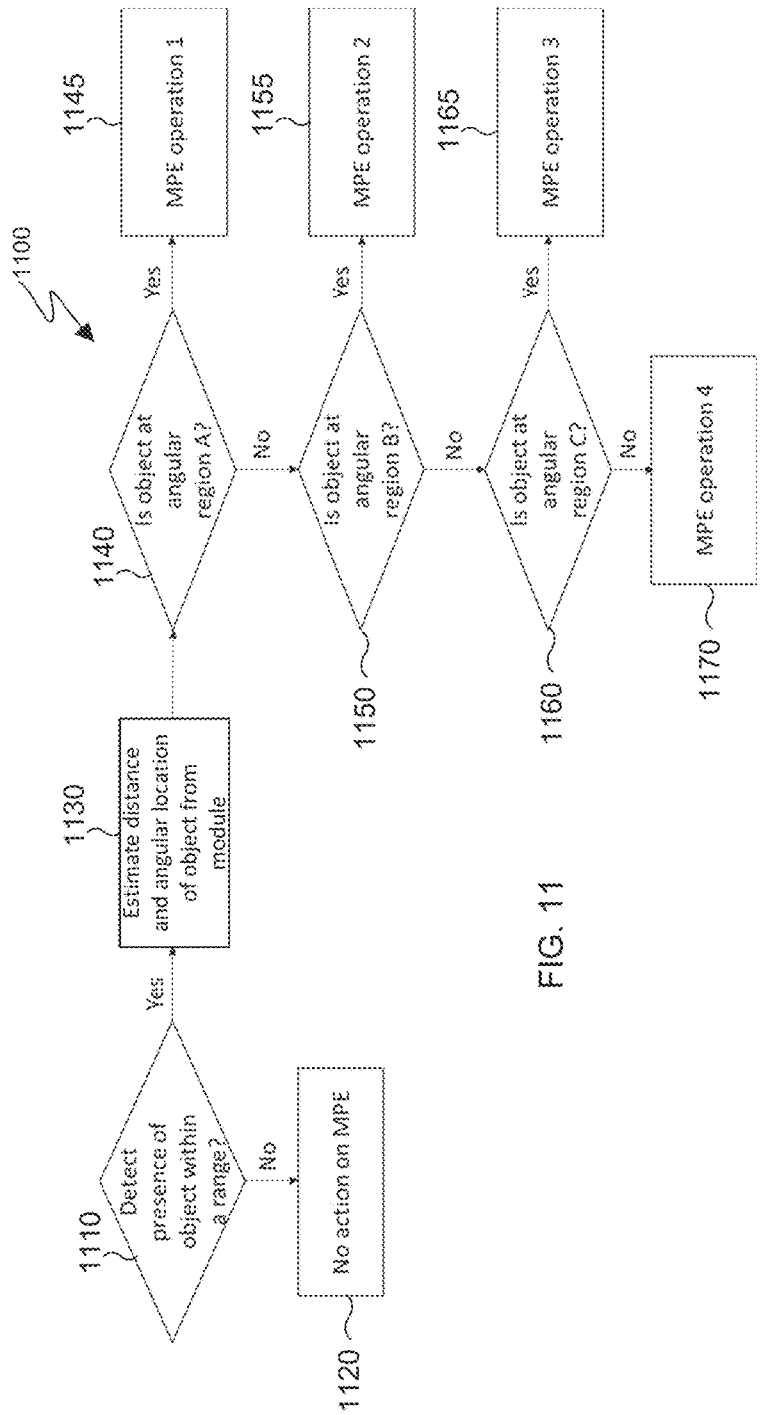
FIG. 11 illustrates a block diagram of example method for applying multiple MPE operations based an object distance and according to angular locations of the object according to embodiments of this disclosure.

FIG. 11 illustrates a block diagram of example method 1100 for applying multiple MPE operations based an object distance and according to angular locations of the object according to embodiments of this disclosure. The embodiment of FIG. 11 is for illustration only. Other embodiments can be used without departing from the scope of the present disclosure.

Referring to FIG. 11, the electronic device's 200 response to achieve RF compliance is a function of distance of the object in proximity of the antenna array. In step 1110, a UE, such as the electronic device 200 of FIG. 2, detects whether an object is within a predetermined range. The predetermined range is an estimated distance, which can be represented as one value (e.g. in cm) or as a range of values (e.g. 0-4 cm). If there is no object within the predetermined range, the electronic device 200 continues to operate under normal conditions in step 1120. If there is an object within the predetermined range, the electronic device 200 proceeds to measure the distance and angular position of the object from an antenna array using radar signal processing in step 1130. The angular location of the detected object can be represented as a single azimuth and/or a single elevation direction, or ranges of azimuth and/or a single elevation direction (generally, angular region). The process to measure the distance and angular location using radar signal processing is the same as explained in reference to steps 830, using steps 831-835 of FIG. 8. The distance and angle of the detected object from the radar module is estimated from the radar signals reflected off the object, which can be in the form of CIR. Different MPE operations can be performed for different angular locations of the object. According to embodiments of this disclosure, in step 1140, the electronic device 200 determines whether the detected object is in angular region A, and if so, MPE operation 1 is performed in step 1145. In step 1150, the electronic device 200 determines if the object is detected to be in angular region B and if so, MPE operation 2 is performed in step 1155. In step 1160, the electronic device 200 determines if the object is detected to be within angular region C and if so, MPE operation 3 is performed in step 1165. Otherwise the electronic device 200 performs MPE operation 4 in step 1170. The MPE operations can be one or more of the MPE compliance operations as described herein.

Figures 12, 13:
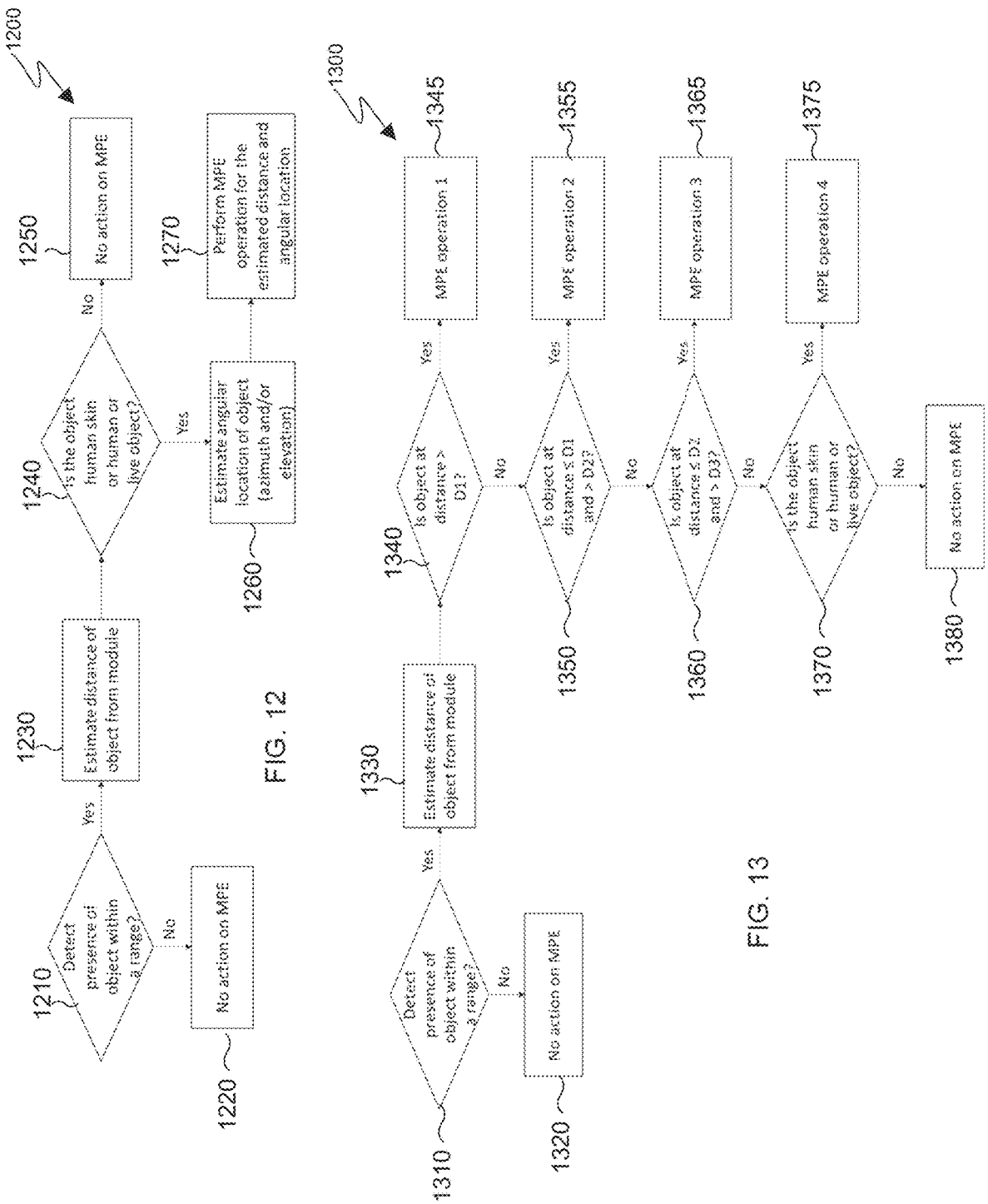
FIG. 12 illustrates a block diagram of an example method for applying an MPE operation based on an object material according to embodiments of this disclosure.
FIG. 13 illustrates a block diagram of an example method for applying multiple MPE operations according to an object distance and an object material according to embodiments of this disclosure.

FIG. 12 illustrates a block diagram of an example method 1200 for applying an MPE operation based on an object material according to embodiments of this disclosure. A UE, such as the electronic device 200 of FIG. 2, includes a radar module which can be a separate module located next to, or nearby, the mmWave antenna module, or can be integrated with the mmWave antenna module by co-sharing the same antenna elements, or subset thereof, can be utilized to detect the presence of one or more objects within the detection range in step 1210. If no object is detected the electronic device 200 continues to operate in the normal fashion without applying an MPE operation in step 1220. If an object is detected within the range, then in step 1230, the electronic device 200 estimates the distance of the object from the radar module using radar signals reflected off the object, which can be in the form of CIR. In step 1240, the electronic device 200 determines whether the detected object has a material type of human, that is human skin, or a living being. The material type detection can be performed with the radar signal using supervised machine learning or classifier techniques. The classifier can be distance dependent, i.e., there can one classifier for each distance range. The material type detection can also be performed by measuring the reflection coefficient using a bidirectional coupler which is positioned between the antenna and the front-end module. The object material can be determined by comparing the reflection coefficient with a lookup table. The lookup table can be distance dependent, such that there is a lookup table for each distance range.

If the object is identified as not human, human skin, or living being, no action on MPE may be needed and the method proceeds to step 1250. Otherwise, the angular location of the object can be estimated in step 1260 using for example the radar signal processing method as explained in reference to steps 830, using steps 831-835 of FIG. 8. A certain MPE operation can be performed in step 1270 depending on the estimated distance or the angular location of the object.

According to embodiments of this disclosure, the material type detection can only be performed for certain detected distances. For example, the material type detection may only occur if sufficiently reliable detection is possible at a certain distance. FIG. 13 illustrates a block diagram of an example method 1300 for applying multiple MPE operations according to an object distance and an object material according to embodiments of this disclosure. The embodiment of FIG. 13 is for illustration only. Other embodiments can be used without departing from the scope of the present disclosure.

Referring to FIG. 13, a UE's response to achieve RF compliance is a function of distance of the object in proximity of the antenna array. In step 1310, the UE, such as the electronic device 200 of FIG. 2, detects whether an object is within a predetermined range. The predetermined range is an estimated distance, which can be represented as one value (e.g. in cm) or as a range of values (e.g. 0-4 cm). If there is no object within the predetermined range, the electronic device 200 continues to operate under normal conditions in step 1320. If an object is detected within the range, then in step 1330, the electronic device 200 estimates the distance of the object from the radar module using radar signals reflected off the object, which can be in the form of CIR. The distance of the detected object from the radar module is estimated from the radar signals reflected off the object, which can be in the form of CIR. Denote $D_i$, i=0, 1, 2, 3, . . . where $D_i > D_{i+1}$, as the different distances of the detected object from the radar or the antenna module. Different MPE operations can be performed for different distances. According to embodiments of this disclosure, in step 1340 the electronic device 200 determines whether object is detected to be at distance $>D_1$ and if so, MPE operation 1 is performed in step 1345. In step 1350, the electronic device 200 determines if the object is detected to be at distance $>D_2$ and $\leq D_1$ and if so, MPE operation 2 is performed in step 1355. In step 1360, the electronic device 200 determines if the object is detected to be at distance $>D_3$ and $\leq D_2$ and MPE operation 3 is performed in step 1365. In step 1370, when the distance is less than $D_3$, the material type of the object is detected. If the detected object is human, human skin, or a living being, MPE operation 4 is performed in step 1375. Otherwise the electronic device continues to operate under normal conditions in step 1380. The MPE operations can be one or more of the MPE compliance operations as described herein.

Although FIG. 13 illustrates one example of a method 1300 for applying multiple MPE operations according to an object distance and an object material, various changes can be made to FIG. 13. For example, the method can apply the MPE operations based on the angular regions in which the detected object is located. Various steps in FIG. 13 could overlap, occur in parallel, occur serially, occur in a different order, or occur any number of times.

According to embodiments of this disclosure, a MPE operation can involve coordination of multiple antenna arrays or modules. Antenna module switching as described above in MPE operation (c) is one type of coordination among antenna modules. Other coordination schemes are possible.

According to embodiments of this disclosure, when the power level for one module is reduced, but not to zero power level, another antenna module can increase its power which can be from a zero power level. This can reduce the power density in the proximity of the object for MPE compliance, while mitigating the negative impact of received signal strength degradation at the base station. In this example, it is assumed that multiple antenna modules can be transmitting simultaneously. A lookup table can map the target total transmit power level, which can be controlled by the base station, to the combination of transmit power levels of each antenna module. Table 1 is an example look up table.

TABLE 1

| Target total transmit power level | Transmit power level of antenna module/array 1 | Transmit power level of antenna module/array 2 |
| --- | --- | --- |
| PT1 | P11 | P21 |
|  | P12 | P22 |
|  | P13 | P23 |
| PT2 | P14 | P24 |
|  | P15 | P25 |
|  | P16 | P26 |
| . . . | . . . | . . . |

In another example, the transmission powers of each antenna module can be calculated with a formula, e.g. P1=PT−Δ (dB), P2=Δ; where P1 and P2 are the transmit powers in dB of the first and second antenna modules, respectively. Δ is the power back-off needed for the first antenna module to meet the MPE compliance, and PT is the target total transmit power of the UE in dB. This coordination of transmission power level can also be applied to multiple antenna arrays within an antenna module.

Figure 14:
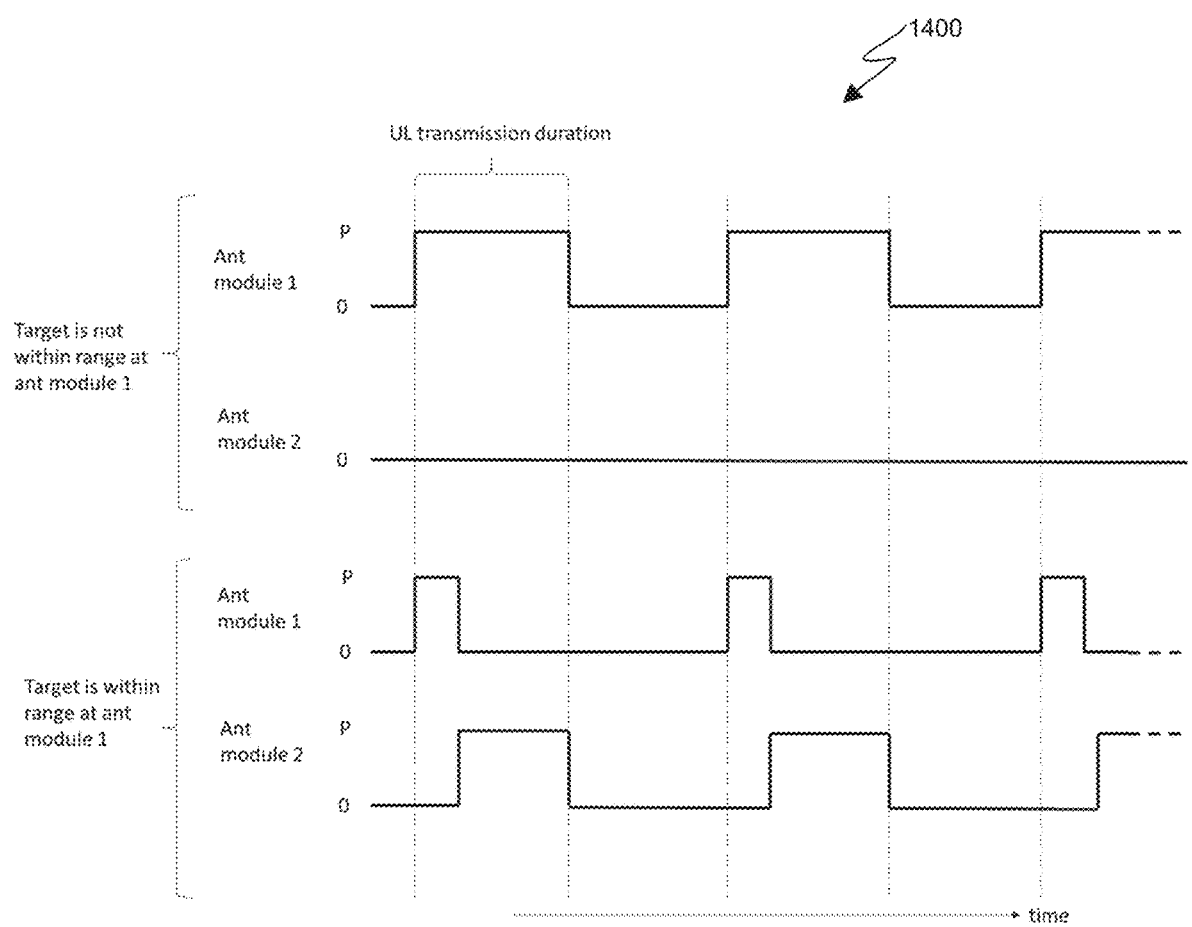
FIG. 14 illustrates a timing diagram for an MPE operation with a reduced transmission duty cycle for the first antenna module and the activation of the second antenna module according to embodiments of this disclosure.

FIG. 14 illustrates a timing diagram 1400 for an MPE operation with a reduced transmission duty cycle for the first antenna module and the activation of the second antenna module according to embodiments of this disclosure. For example, when the transmission duty cycle is reduced for a first antenna module due to MPE compliance, part of or all of the loss in transmission time for the first antenna module can be compensated by a second antenna module by activating and transmitting with the second antenna module. If only one antenna module can transmit at a given time, the second antenna module can transmit when the first antenna module does not transmit. This operation can be beneficial compared to the operation where only the second antenna module is used for transmission, i.e. hard switching, if the first antenna module is still favorable in terms of received signal strength or SINR at the base station received. According to an embodiment, the first antenna module can be used to transmit PUCCH/PRACH/SRS, while the second antenna module can be used to transmit PUSCH. This coordination of transmission duty cycle can also be applied to multiple antenna arrays within an antenna module, i.e. when the transmission duty cycle is reduced for a first antenna array of an antenna module due to MPE compliance, part of or all of the loss in transmission time for the first antenna array can be compensated by a second antenna array in the same module by activating and transmitting with the second antenna array. More generally, when the transmission duty cycle is reduced for a first beam due to MPE compliance, part of or all the loss in transmission time can be compensated by a second beam of:

(1) The same antenna module, where the second beam can be from:
    A. The same antenna array
    B. A different antenna array
(2) A different antenna module.

According to another embodiment, when one or more beams of a first antenna module is disabled to meet MPE compliance, one or more beams of a second antenna module can be enabled to mitigate the negative impact in the degradation of UE radio spherical coverage. There can be look up table mapping a disabled beam in a first antenna module to an enabled beam in a second antenna module. Table 2 is an example lookup table. This coordination of beams can also be applied to multiple antenna arrays within an antenna module.

TABLE 2

| Disabled beam (due to MPE) in antenna module 1 | Enabled beam in antenna module 2 |
| --- | --- |
| B11 | B23 |
| B12 | B21 |
| B13 | B25 |
| B14 | B26 |
| B15 | B23 |
| B16 | B22 |
| ... | ... |

Figure 15:
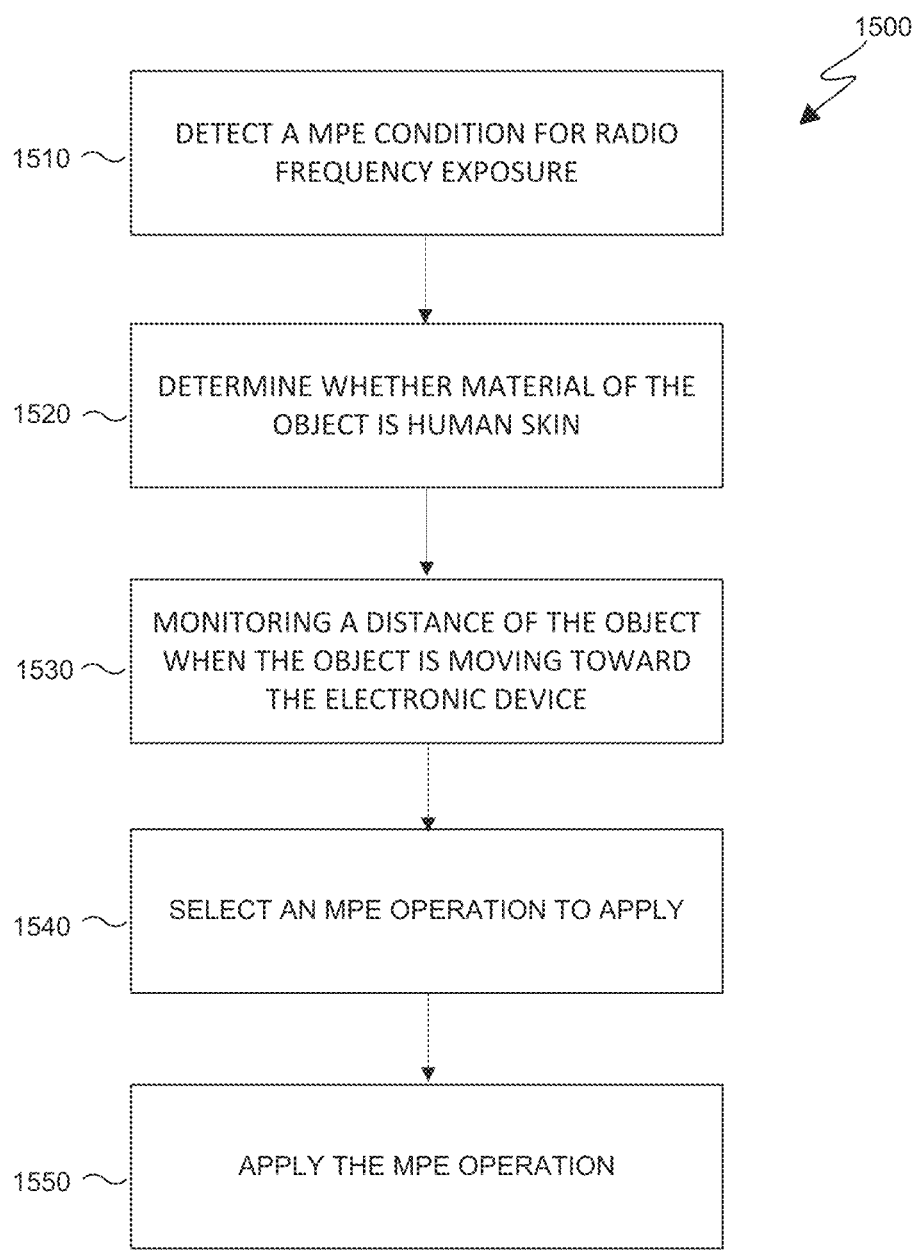
FIG. 15 illustrates an example method of applying an MPE operation according to embodiments of this disclosure.

FIG. 15 illustrates a block diagram of an example method 1500 of applying a MPE operation according to embodiments of this disclosure. While the flow chart depicts a series of sequential steps, unless explicitly state, no inference should be drawn from that sequence regarding specific order of performance, performance of steps or portions thereof serially rather than concurrently or in an overlapping manner, or performance of the steps depicted exclusively without the occurrence of intervening of intermediate steps.

In block 1510, the electronic device 200 detects a MPE condition for radio frequency exposure. For example, a MPE condition can be detected by detecting whether an object is within a predefined distance of the electronic device 200. When the object is within the predetermined distance, the electronic device 200 determines a distance of the object from the electronic device 200 by transmitting signals using a radar transceiver such as the radar transceiver 270 of FIG. 2 or the transmitter 304 of the example monostatic radar of FIG. 3 toward an object. According to embodiments of this disclosure a MPE condition can be detected by determining an angular location or the position of the object relative to the electronic device 200 using the radar transceiver 270.

In block 1520, the electronic device 200 determines whether the material of the object is human skin. According to embodiments, the electronic device 200 uses the determination of the object material when selecting and applying the MPE operations during use.

In block 1530, the electronic device 200 monitors a distance of the object when the object is moving toward the electronic device 200. For example, if the object is not stationary and is in motion toward the electronic device, the electronic device monitors the distance in order to select a MPE operation to apply based on the monitored distance. According to embodiments of this disclosure the selected MPE operation is also based on the material of the object being human skin.

In block 1540, the electronic device 200 selects a MPE operation to apply in order to control and limit RF exposure to a user. According to embodiments of this disclosure the electronic device selects a MPE operation from a plurality of MPE operations based on the determined distance of the object. For example, the electronic device 200 selects a first MPE operation from among the plurality of MPE operations based on the determined distance of the object being greater than a first distance and selects a second MPE operation from among the plurality of MPE operations based on the determined distance of the object being less than the first distance and greater than a second distance. According to embodiments of this disclosure the electronic device selects a MPE operation from a plurality of MPE operations based on the angular location of the object. For example, the electronic device 200 selects a first MPE operation from among the plurality of MPE operations based on the object being located in a first angular region relative to the electronic device 200; and selects a second MPE operation from among the plurality of MPE operations based on the object being located in a second angular region relative to the electronic device 200. According to embodiments of this disclosure, the electronic device 200 can select a MPE operation to apply based on the determination that the material of the object is human skin and the monitored distance of the object when it is moving toward the electronic device 200. For example, the electronic device selects a first MPE operation to apply from among the plurality of MPE operations based on the monitored distance of the object being greater than a first distance, and the electronic device selects a second MPE operation to apply from among the plurality of MPE operations based on the monitored distance of the object being less than the first distance and greater than a second distance, and the electronic device selects a third MPE operation to apply from among the plurality of MPE operations based on the monitored distance of the object being less than the second distance and the object material being human skin; and the electronic device does not apply any MPE operation based on the monitored distance of the object being less than the second distance and the object material not being human skin.

In block 1550, the electronic device 200 applies the MPE operation from among the plurality of MPE operations to at least one of a plurality of antenna arrays to modify the radio frequency. According to embodiments of this disclosure the MPE operation comprises coordination of at least two antenna arrays for signal transmission. For example, the electronic device 200 applies the MPE operation by identifying a first antenna array from the plurality of antenna arrays that is closer to the object than a second antenna array from the plurality of antenna arrays based on the position of the object relative to the electronic device and reduces a power level for the first antenna array in order to reduce a power density in proximity to the object, and increases a power level for the second antenna to compensate at least in part for a reduction in the power level for the first antenna array. For another example, the electronic device 200 applies the MPE operation by identifying, based on the position of the object relative to the electronic device, at least one beam of a first antenna array radiating in a direction toward the object and disables the at least one beam of a first antenna array to reduce a power density in proximity to the object, and enables at least one beam of a second antenna array to compensate at least in part for the disablement of the at least one beam of the first antenna array.

According to embodiments of this disclosure, the MPE operation can be applied based on a predefined priority rule. For example, the electronic device can apply the MPE operation on a PUSCH without UCI while not applying the MPE operation on a PUCCH, a PRACH, and a PUSCH with UCI. For another example, the electronic device can apply the MPE operation on a secondary carrier before a primary carrier. The MPE operations given here are for example only and do not limit the scope or definition of the MPE operations and methods to apply the operations as described above.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

None of the description in this application should be read as implying that any particular element, step, or function is an essential element that must be included in the claim scope. The scope of patented subject matter is defined only by the claims. Although the present disclosure has been described with an example embodiment, various changes and modifications can be suggested by or to one skilled in the art. It is intended that the present disclosure encompass such changes and modifications as fall within the scope of the appended claims.

What is claimed is:

1. An electronic device comprising:
a plurality of antenna arrays; and
a processor operably connected to the plurality of antenna arrays, the processor configured to:
detect a maximum permissible exposure (MPE) condition for radio frequency exposure;
monitor a distance of an object from the electronic device;
select a first MPE operation from among a plurality of MPE operations based on the monitored distance of the object being greater than a first distance;
select a second MPE operation from among the plurality of MPE operations based on the monitored distance of the object being less than the first distance and greater than a second distance;
select a third MPE operation from among the plurality of MPE operations based on the monitored distance of the object being less than the second distance and a determination that an object material is human skin; and
apply the selected MPE operation, from among the plurality of MPE operations, to at least one of the plurality of antenna arrays to modify the radio frequency exposure,
wherein the selected MPE operation comprises coordination of at least two of the antenna arrays for signal transmission.

2. The electronic device of claim 1, wherein:
the processor is further configured to apply the selected MPE operation based on a predefined priority rule, and the predefined priority rule comprises the processor further configured to at least one of (i) apply the selected MPE operation on a physical uplink shared channel (PUSCH) without uplink control information (UCI) while not applying the selected MPE operation on a physical uplink control channel (PUCCH), a physical random access channel (PRACH), and a PUSCH with UCI, or (ii) apply the selected MPE operation on a secondary carrier before a primary carrier.

3. The electronic device of claim 1, further comprising:
a radar transceiver,
wherein the processor is further configured to:
detect the MPE condition by determining whether the object is within a threshold distance of the electronic device;
based on the object being within the threshold distance, determine the distance of the object from the electronic device using the radar transceiver; and
select the MPE operation based on the determined distance of the object.

4. The electronic device of claim 3, wherein the processor is further configured to:
determine an angular location of the object relative to the electronic device; and
select the MPE operation based on the angular location of the object.

5. The electronic device of claim 4, wherein the processor is further configured to:
select a fourth MPE operation from among the plurality of MPE operations based on the object being located in a first angular region relative to the electronic device; and
select a fifth MPE operation from among the plurality of MPE operations based on the object being located in a second angular region relative to the electronic device.

6. The electronic device of claim 3, wherein to monitor the distance of the object from the electronic device, the processor is further configured to:
monitor the distance of the object from the electronic device as the object is moving toward the electronic device using the radar transceiver, and
not apply any MPE operation based on the monitored distance of the object being less than the second distance and a determination that the object material is not human skin.

7. The electronic device of claim 1, wherein:
the processor is further configured to determine a position of the object relative to the electronic device; and
to apply the selected MPE operation, the processor is further configured to:
identify a first antenna array from the plurality of antenna arrays that is closer to the object than a second antenna array from the plurality of antenna arrays based on the position of the object relative to the electronic device,
reduce a power level for the first antenna array from the plurality of antenna arrays to reduce a power density in proximity to the object, and
increase a power level for the second antenna array from the plurality of antenna arrays to compensate at least in part for a reduction in the power level for the first antenna array.

8. The electronic device of claim 1, wherein:
the processor is further configured to determine a position of the object relative to the electronic device; and
to apply the selected MPE operation, the processor is further configured to:

identify, based on the position of the object relative to the electronic device, at least one beam of a first antenna array radiating in a direction toward of the object, disable the at least one beam of a first antenna array to reduce a power density in proximity to the object, and enable at least one beam of a second antenna array from the plurality of antenna arrays to compensate at least in part for the disablement of the at least one beam of the first antenna array.

9. A method to apply a maximum permissible exposure (MPE) operation on an electronic device, the method comprising:

detecting an MPE condition for radio frequency exposure;

monitoring a distance of an object from the electronic device;

selecting a first MPE operation from among a plurality of MPE operations based on the monitored distance of the object being greater than a first distance;

selecting a second MPE operation from among the plurality of MPE operations based on the monitored distance of the object being less than the first distance and greater than a second distance;

selecting a third MPE operation from among the plurality of MPE operations based on the monitored distance of the object being less than the second distance and a determination that an object material is human skin; and applying the selected MPE operation, from among the plurality of MPE operations, to at least one of a plurality of antenna arrays of the electronic device to modify the radio frequency exposure, wherein the selected MPE operation comprises coordination of at least two of the antenna arrays for signal transmission.

10. The method of claim 9, further comprising: applying the selected MPE operation based on a predefined priority rule, wherein the predefined priority rule comprises at least one of (i) applying the selected MPE operation on a physical uplink shared channel (PUSCH) without uplink control information (UCI) while not applying the selected MPE operation on a physical uplink control channel (PUCCH), a physical random access channel (PRACH), and a PUSCH with UCI, or (ii) applying the selected MPE operation on a secondary carrier before a primary carrier.

11. The method of claim 9, further comprising:

detecting the MPE condition by determining whether the object is within a threshold distance of the electronic device using a radar transceiver;

based on the object being within the threshold distance, determining the distance of the object from the electronic device using the radar transceiver; and selecting the MPE operation based on the determined distance of the object.

12. The method of claim 11, further comprising:

based on the object being within a predefined distance, determining an angular location of the object relative to the electronic device; and selecting the MPE operation based on the angular location of the object.

13. The method of claim 12, further comprising:

selecting a fourth MPE operation from among the plurality of MPE operations based on the object being located in a first angular region relative to the electronic device; and selecting a fifth MPE operation from among the plurality of MPE operations based on the object being located in a second angular region relative to the electronic device.

14. The method of claim 11, wherein monitoring the distance of the object from the electronic device comprises monitoring the distance of the object from the electronic device when the object is moving toward the electronic device using the radar transceiver, the method further comprising:

not applying any MPE operation based on the monitored distance of the object being less than the second distance and a determination that object material is not human skin.

15. The method of claim 9, further comprising:

determining a position of the object relative to the electronic device, wherein applying the selected MPE operation comprises:
identifying a first antenna array from the plurality of antenna arrays that is closer to the object than a second antenna array from the plurality of antenna arrays based on the position of the object relative to the electronic device, reducing a power level for the first antenna array from the plurality of antenna arrays to reduce a power density in proximity to the object, and increasing a power level for the second antenna array from the plurality of antenna arrays to compensate at least in part for a reduction in the power level for the first antenna array.

16. The method of claim 9, further comprising:

determining a position of the object relative to the electronic device, wherein applying the selected MPE operation comprises:
identifying, based on the position of the object relative to the electronic device, at least one beam of a first antenna array from the plurality of antenna arrays radiating in a direction toward of the object, disabling the at least one beam of a first antenna array to reduce a power density in proximity to the object, and enabling at least one beam of a second antenna array from the plurality of antenna arrays to compensate at least in part for the disablement of the at least one beam of the first antenna array.

* * * * *